United States Patent [19]
Aoki et al.

[11] Patent Number: 4,957,812
[45] Date of Patent: Sep. 18, 1990

[54] COMPOSITE MAGNETIC POWDER, METHOD FOR PRODUCING THE SAME AND RECORDING MEDIUM CONTAINING THE SAME

[75] Inventors: Nobuyuki Aoki, Hirakata; Masaki Aoki, Minou; Hideo Torii, Higashiosaka; Keiichi Ochiai, Hirakata; Eiji Fujii, Osaka, all of Japan

[73] Assignee: Matsushita Electric Industrial Co., Ltd., Osaka, Japan

[21] Appl. No.: 107,454

[22] Filed: Oct. 13, 1987

[30] Foreign Application Priority Data

Oct. 13, 1986 [JP] Japan .................................. 61-242425
Dec. 1, 1986 [JP] Japan .................................. 61-286328
May 7, 1987 [JP] Japan .................................. 62-111029

[51] Int. Cl.$^5$ ........................................... G11B 23/00
[52] U.S. Cl. .................... 428/329; 252/62.56; 252/62.63; 428/694; 428/900
[58] Field of Search .............. 428/694, 900, 329; 252/62.58, 62.54, 62.56, 62.63

[56] References Cited

U.S. PATENT DOCUMENTS

| | | | |
|---|---|---|---|
| 4,584,242 | 4/1986 | Wagai et al. ........................ | 428/694 |
| 4,600,521 | 7/1986 | Nakamura et al. ................ | 428/694 |
| 4,659,626 | 4/1987 | Fukushima et al. ............... | 428/694 |
| 4,707,410 | 11/1987 | Hata et al. ........................ | 428/694 |
| 4,716,077 | 12/1987 | Okita et al. ........................ | 428/694 |

FOREIGN PATENT DOCUMENTS

0290263 11/1988 European Pat. Off. .

OTHER PUBLICATIONS

"Patent Abstracts of Japan", vol. 11, No. 366 (P–641), Nov. 11, 1987, p. 120P641 (JP–A–62129121).
"Patent Abstracts of Japan", vol. 12, No. 193 (E–617), Jun. 4, 1988, p. 147E617 (JP–A–62296501).
"Patent Abstracts of Japan", vol, 11, 342 (P–635), Nov. 10, 1987, p. 26P635 (JP–A–62124564).
Kiyama, "Bull. Chem. Soc. Japan", 49(7), pp. 1855–1860, (Jul. 1976).
Kubo et al., "IEEE Transactions on Magnetics", vol. MAG–18 (6), pp. 1122–1124, (Nov. 1982).

*Primary Examiner*—Paul J. Thibodeau
*Attorney, Agent, or Firm*—Wenderoth, Lind, & Ponack

[57] ABSTRACT

Disclosed is a composite magnetic powder comprising two crystal phases of a hexagonal ferrite portion and a spinel structure ferrite portion, which are different in thermal characteristic and in crystal structure and which are in a crystallographically epitaxial relation in each particle. The magnetic powder can be synthesized by reaction of starting components in a low temperature solution. Using the magnetic powder, a vertical magnetic recording medium can be provided, which is excellent in weather stability and suitable for short wavelength recording.

2 Claims, 3 Drawing Sheets

1 ··· Spinel structure ferrite
2 ··· Hexagonal ferrite
21 ··· Spinel structure layer
22 ··· Layer containing $Ba^{2+}$, $Fe^{3+}$, $O^{2-}$ 1 ··· Spinel structure ferrite
2 ··· Hexagonal ferrite
21 ··· Spinel structure layer
22 ··· Layer containing $Ba^{2+}$, $Fe^{3+}$, $O^{2-}$

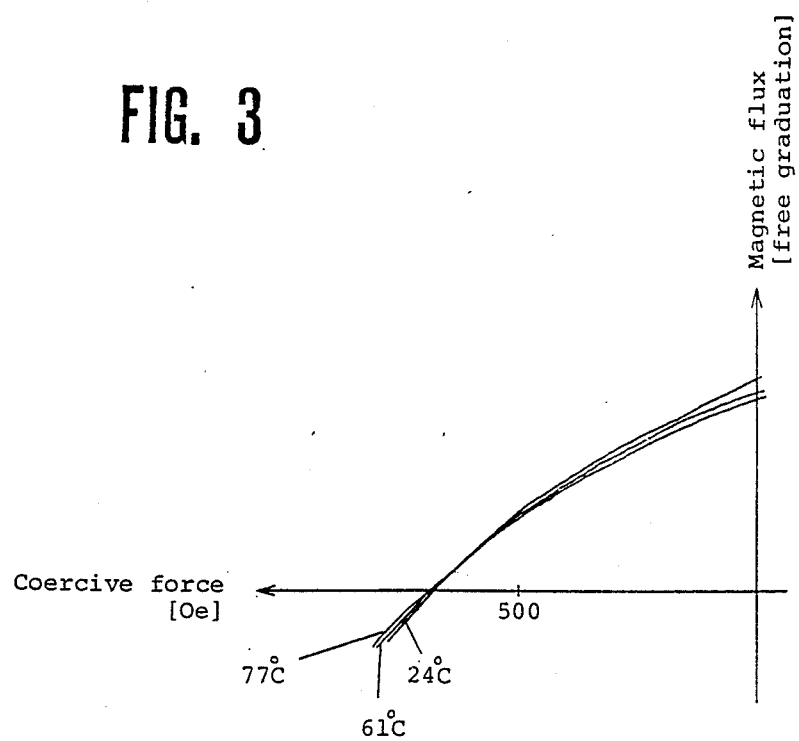

COMPOSITE MAGNETIC POWDER, METHOD FOR PRODUCING THE SAME AND RECORDING MEDIUM CONTAINING THE SAME

BACKGROUND OF THE INVENTION

1. Field of the invention:

The present invention relates to recording media including audio tapes, video tapes, floppy disks, etc., in particular, to a magnetic powder for use as a material of such recording media, and to a method of producing the same.

2. Description of the Prior Art:

Recently, magnetic recording has been directed to high-density recording and digital recording. Conventionally, a so-called longitudinal magnetic recording system has been a major magnetic recording system, in which the easily magnetizable axis is in the plane of the magnetic recording medium. In accordance with this system, however, it is difficult to elevate the recording density of the recording medium, since the magnetized particles are so arranged that the magnetized directions thereof are repellent to one another with the increase of the recording density. Accordingly, a so-called perpendicular recording system has recently been considered for solving the problem, in which the recording is effected perpendicularly to the plane of the magnetic recording medium. (For example, refer to "High-density Magnetic Recording by Perpendicular Magnetization", Shunichi Iwasaki, Nikkei Electronics, Aug. 7, 1978, pages 100 to 111, Japan.)

For a recording medium suitable for use in the perpendicular magnetic recording system, it is essential to have an easily magnetizable axis in the perpendicular direction to the plane of the magnetic recording medium and the medium includes, for example, a thin film of an evaporation-plated alloy such as cobalt-chromium, and a hexagonal ferrite thin film. In particular, the hexagonal ferrite is expected to be useful as a coating-type perpendicular magnetic recording media (For example, refer to Japanese Laid-open Patent Application No. 60-193127.

As the hexagonal ferrite magnetic powder, there are known, for example, barrium ferrite, strontium ferrite and lead ferrite magnetic powders. Since these powders are hexagonal plate-like particles each of which has an easily magnetizable axis in the vertical direction to the hexagonal plane and the plane can easily become parallel to the magnetic recording medium plane when merely coated on the base of the medium, the magnetic powders are suitable for use in perpendicular magnetic recording media. For producing the hexagonal ferrite magnetic powder, certain methods have been established such as a hydrothermal reaction method and a glass crystallization method. (For example, refer to "Conditions for the Formation of Compounds Consisting of BaO and $Fe_2O_3$ from Aqueous Suspensions", M. Kiyama, Bulletin of the Chemical Society of Japan, Vol. 49, No. 7 (July, 1976), pp. 1855–1860, or "Properties of Ba Ferrite Particles for Perpendicular Magnetic Recording Media", O. Kubo et al., IEEE Transactions on Magnetics, Vol. MAG-18, No. 6 (November 1982), pp. 1122–1124.)

However, although the magnetic recording medium formed by barium ferrite plate-like magnetic powder, for example, among the above-mentioned hexagonal ferrite, is excellent in magnetic recording characteristics in a short wavelength range, this has a defect in that this is inferior to a $\gamma$-$Fe_2O_3$ type magnetic powder-containing medium, which is a conventional medium for longitudinal magnetic recording system, in a long wavelength range. In addition, the barium ferrite plate-like magnetic powder has a large positive temperature coefficient of the coercive force Hc. Therefore, even when a signal is recorded on the barium ferrite-containing magnetic recording medium at normal temperature, the signal would not be reproduced optimally at a higher temperature because the coercive force would vary in accordance with the temperature elevation by environmental variation.

Moreover, although the above-mentioned hexagonal ferrite such as barium ferrite could sufficiently be used in the perpendicular magnetic recording medium due to the hexagonal plate-like particles each having an easily magnetizable axis in the perpendicular direction to the plane, the hexagonal ferrite which has conventionally been used has a small saturation magnetization and is poor in perpendicular orientation. Therefore, the conventional hexagonal ferrite cannot achieve sufficient recording and reproduction performance with the ferrite head which is generally used at present. In particular, the reproduction output level is largely reduced with increased recording density, and therefore, the recording density cannot sufficiently be elevated.

SUMMARY OF THE INVENTION:

An object of the present invention is to provide a magnetic powder which is excellent in the thermal characteristic of the coercive force and which has a large magnetization value, as well as to provide a high density recording medium which is excellent in the magnetic characteristic and the thermal characteristic of the coercive force.

A magnetic powder of the present invention is a composite type magnetic powder which comprises a plate-like hexagonal ferrite with c-axial crystal orientation and a spinel structure ferrite epitaxially grown on the surface of the hexagonal ferrite.

This magnetic powder can be produced by adding an aqueous alkali solution to a suspension which comprises an aqueous solution containing a ferrous ion dissolved therein and a plate-like hexagonal ferrite magnetic powder with a developed c-axial orientation, followed by reaching the resulting mixture in an oxidative atmosphere. More precisely, a specific crystal plane (e.g., (111), etc.) of a spinel structure ferrite capable of matching with the C-plane of the plate-like hexagonal ferrite magnetic powder with c-axial crystal orientation is selectively epitaxially grown on the C-plane of the plate-like hexagonal ferrite magnetic powder by adjusting the ferrous ion, the pH concentration of the reaction solution and the reaction atmosphere, whereby the both are integrated at a low temperature to give an integrated composite crystal structure. When the ferrous ion is reacted in the reaction solution by the oxidation reaction to grow to form the spinel structure ferrite in the presence of the c-axial crystal-orienting hexagonal ferrite, which has the same crystal arrangement, the nuclear growth of the spinel ferrite is effected on the C-plane of the hexagonal ferrite and additionally, there is almost no misfitting on the crystal lattice constant. Therefore, the epitaxial growth of the spinel structure ferrite on the C-plane of the hexagonal ferrite preferentially proceeds than the single crystallization of the spinel structure ferrite in the solution. As the magnetic powder of the present invention thus produced comprises the hexagonal ferrite crystal part and the spinel structure ferrite crystal part which are integrated to form the integrated composite magnetic powder, the coercive force can freely be controlled, and the composite ratio can freely be determined so that the coercive force does not vary even under the variation of the environmental temperature.

The above-mentioned composite type magnetic powder of the present invention can be dispersed and coated on a non-magnetic support, in combination with a resin binder, to form a magnetic recording medium, which is high in the weather-resistance and has a high power output in a short wavelength range.

Furthermore, as the magnetic powder of the present invention is composed of the hexagonal ferrite and the spinel structure ferrite which are crystallographically compounded and integrated without any crystallographical misfitting, the magnetized components of both crystal portions are added to each other, whereby the total saturation magnetization increases and the high power output of the resulting recording medium is obtained.

As mentioned above, one conventional medium which is excellent in the weather-resistance of the magnetic characteristic is poor in the output power in the short wavelength range, while, on the other hand, the other conventional medium which has a high output power in the short wavelength range is poor in the weather-resistance, and thus, the improvement of the weather-resistance and the elevation of the output power in the short wavelength range is contradictory to each other. Despite such situation, the present invention, advantageously utilizing the matching property of the crystal arrangement between the hexagonal ferrite and the spinel structure ferrite and the epitaxial relation therebetween, succeeded in the formation of the composite type magnetic power which is excellent in magnetic characteristics in a low temperature solution and is rich in the weather-resistance.

BRIEF DESCRIPTION OF THE DRAWINGS:

FIG. 3 is a graph to show a variation of the coercive force of the particulate magnetic recording medium having the composite type magnetic powder of one embodiment of the present invention, in the temperature range from 0° to 100° C.

Figure 1:
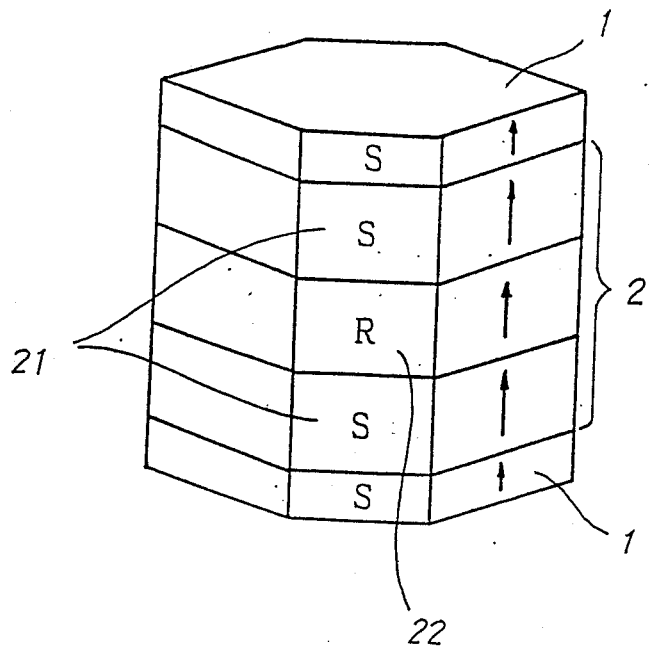
FIG. 1 is a view to typically show a structure of the composite type magnetic powder of the present invention.

DESCRIPTION OF THE PREFERRED EMBODIMENT:

FIG. 1 is a view to typically show a structure of the composite type magnetic powder of the present invention, in which 1 is a spinel structure ferrite, 2 is a hexagonal ferrite, 21 is a layer having a spinel structure, and 22 is a layer containing $Ba^{2+}$, $Fe^{3+}$ and $O^{2-}$. This structure of the composite type magnetic powder comprises a magnetoplumbite structure hexagonal ferrite 2 and a spinel structure ferrite 1, in which a specific crystal plane (such as (111), etc.) of the latter ferrite 1 is epitaxially grown on the C-plane of the former ferrite 2 with no crystallographical misfitting therebetween. Accordingly, the thermal characteristic of the coercive force of the magnetic powder is improved and, additionally, the magnetic spin axis is made identical to the c-axis and therefore the magnetization value of the powder also increases. The spinel structure ferrite may be magnetite ($Fe_3O_4$), maghemite ($\gamma$-$Fe_2O_3$), cobaltferrite ($Co_xFe_{2-x}O_4$, in which x may be a free number), lead-iron series ferrite ($Pb_yFe_{2-y}O_4$, in which y may be a free number), zinc-iron series ferrite ($Zn_sFe_{2-s}O_4$, in which s may be a free number), and manganese-iron sereis ferrite ($Mn_tFe_{2-t}O_4$, in which t may be a free number). The hexagonal ferrite may comprise hexagonal plate-like particles which have a magnetoplumbite type structure of $MO.nFe_2O_3$ (where M is one or more co-existing metal elements selected from the group consisting of Ba, Sr, Pb and Ca, and n is 5 to 6) and in which the C-plane (or (001) plane) is crystallographically grown. Alternatively, the hexagonal ferrite may be a ferrite powder in which a part of the Fe element in the constitutional elements of the above-mentioned constitution is substituted by a divalent-tetravalent ion pair (provided that the divalent ion is selected from $Co^{2+}$, $Ni^{2+}$, $Cu^{2+}$ and $Zn^{2+}$, and the tetravelent ion is selected from $Ti^{4+}$, $Zr^{4+}$, $Mo^{4+}$ and $Hf^{4+}$).

The composite type magnetic powder having the above-mentioned structure can be dispersed and coated on a non-magnetic support, together with a resin binder, to form a high-density magnetic recording medium. This medium is excellent in the magnetic characteristic and the thermal characteristic and is suitable for high-density recording.

The following examples are intended to illustrate the present invention but not to limit it in any way.

EXAMPLE 1:

22.0 g of fine particles of hexagonal plate-like $BaFe_{12}O_{19}$ having a magnetoplumbite structure where a part of Fe was substituted by $Cu^{2+}$-$Zr^{4+}$ ion pair (coercive force Hc=870 Oe, saturation magnetization Ms=54.0 emu/g, average particle size 1100 Å, average particle thickness 130 Å, specific surface area 37.0 m²/g) were prepared and suspended in a 300 cc of distilled water from which the dissolved oxygen had previously been removed by bubbling with a nitrogen gas, in a reactor while a nitrogen gas was being introduced thereinto. To this was added an $Fe^{2+}$ ion-containing solution, which had been prepared by completely dissolving 17.0 g of ferrous sulfate ($FeSo_4.7H_2O$) in a 300 cc of distilled water.

Further, 150 cc of 2N sodium hydroxide was added thereto to obtain a colloidal suspension. The reactor containing the colloidal suspension was heated up to 70° C. with stirring the suspension with a nitrogen gas. Afterwards, the bubbling gas was changed from nitrogen to air, while the temperature was being kept at 70° C., and then, the reactor content was stirred for further 10 hours at 70° C. to complete the reaction. The resulting reaction solution was filtered, and the precipitate obtained by the filtration was fully washed with water and dried in a dry oven at 70° C. to obtain a desired powder.

Next, the reaction product thus obtained was subjected to X-ray analysis, electromicroscopic observation and VSM (vibration sample-type magnetometer) for identification and determination of the physical properties and the magnetic characteristics of the product. The experimental conditions are shown in Table 1, samples Nos. 1 to 28. The samples were prepared in the same manner, provided that the oxidation temperature, the pH concentration (molar ratio of the alkali added), the reaction temperature and others were varied as shown in Table 1, and the results of the X-ray analysis, electromicroscopic observation and VSM are shown in Table 2, Nos. 1 to 28.

The X-ray analysis was to confirm whether or not the desired two layer constitution of barium ferrite/spinel structure ferrite was formed. The electromicroscopic observation was used to confirm whether or not the two layer constitution, which had been confirmed by the X-ray analysis, was crystallographically compounded and integrated, or in other words, whether or not the spinel structure ferrite had epitaxially grown on the surface of the barium ferrite. In addition, from the result of the VSM, the saturation magnetization and the thermal coefficient of the coercive force of the respective products obtained were calculated.

In the Tables hereafter shown, the symbol " means "same as above".

TABLE 1

| Sample No. | Coercive Force of Starting Barium Ferrite Powder (Oe) | Oxidation Temp. (°C.) | Molar Ratio of Alkali Added (—) | Reaction Time (hr.) | Drying Temp. (°C.) |
| --- | --- | --- | --- | --- | --- |
| 1 | 870 | 70 | 0.85 | 2 | 70 |
| 2 | 870 | 70 | 0.91 | 10 | 70 |
| 3 | 870 | 70 | 1.01 | 10 | 70 |
| 4 | 870 | 90 | 0.88 | 2 | 70 |
| 5 | 870 | 90 | 0.94 | 2 | 130 |
| 6 | 870 | 90 | 0.86 | 10 | 130 |
| 7 | 870 | 95 | 0.87 | 2 | 130 |
| 8 | 870 | 95 | 0.90 | 10 | 130 |
| 9 | 690 | 71 | 0.81 | 10 | 69 |
| 10 | 690 | 71 | 0.99 | 10 | 69 |
| 11 | 690 | 71 | 1.02 | 10 | 69 |
| 12 | 690 | 88 | 0.79 | 2 | 131 |
| 13 | 690 | 88 | 0.85 | 10 | 131 |
| 14 | 690 | 88 | 0.84 | 10 | 131 |
| 15 | 1050 | 74 | 0.84 | 10 | 75 |
| 16 | 1050 | 74 | 0.91 | 10 | 75 |
| 17 | 1050 | 91 | 0.80 | 2 | 90 |
| 18 | 1050 | 91 | 0.83 | 10 | 90 |
| 19 | 1050 | 91 | 0.83 | 10 | 130 |
| 20 | 1050 | 91 | 1.01 | 10 | 130 |
| 21 | 840 | 35 | 0.85 | 10 | 74 |
| 22 | 840 | 35 | 1.20 | 100 | 74 |
| 23 | 840 | 58 | 0.87 | 10 | 128 |
| 24 | 840 | 69 | 1.55 | 10 | 128 |
| 25 | 1100 | 61 | 0.79 | 20 | 70 |
| 26 | 1100 | 61 | 0.94 | 10 | 95 |
| 27 | 1100 | 40 | 0.86 | 20 | 120 |
| 28 | 1100 | 40 | 1.10 | 20 | 80 |

TABLE 2

| Sample No. | Constituting Crystal Phase | Result of Electomicroscopic Observation | Magnetization Value (emu/g) | Temperature Coefficient of Coercive Force (Oe/°C.) |
| --- | --- | --- | --- | --- |
| 1 | Ba-ferrite, $Fe_3O_4$ | Composite Form | 58.1 | +0.5 |
| 2 | " | " | 59.0 | +0.8 |
| 3 | " | " | 58.6 | +1.1 |
| 4 | " | " | 55.8 | +0.7 |
| 5 | Ba-ferrite, $Fe_2O_3$ | " | 56.2 | +1.1 |
| 6 | " | " | 58.3 | +1.1 |
| 7 | " | " | 57.0 | +0.9 |
| 8 | " | " | 58.2 | +1.2 |
| 9 | Ba-ferrite, $Fe_3O_4$ | " | 56.0 | +0.4 |
| 10 | " | " | 55.1 | −0.1 |
| 11 | " | " | 54.8 | +1.0 |
| 12 | Ba-ferrite, $Fe_2O_3$ | " | 54.4 | +0.5 |
| 13 | " | " | 55.7 | +1.1 |
| 14 | " | " | 56.8 | +0.8 |
| 15 | Ba-ferrite, $Fe_3O_4$ | " | 59.6 | +2.1 |
| 16 | " | " | 57.9 | +1.9 |
| 17 | Ba-ferrite, $Fe_2O_3$ | " | 56.6 | +3.1 |
| 18 | " | " | 57.4 | +1.4 |
| 19 | " | " | 55.8 | +1.1 |
| 20 | " | " | 56.5 | +1.2 |
| 21 | Ba-ferrite, α-FeOOH | Mixed Crystal | 54.1 | +4.1 |
| 22 | Ba-ferrite, α-FeOOH γ-FeOOH | " | 52.9 | +4.5 |
| 23 | Ba-ferrite, α-FeOOH | " | 53.8 | +3.9 |
| 24 | Ba-ferrite, $Fe_3O_4$ α-FeOOH | Mixed Crystal with Partial Epitaxy | 56.5 | +3.7 |
| 25 | Ba-ferrite, α-FeOOH | Mixed Crystal | 51.9 | +5.5 |
| 26 | " | " | 52.5 | +4.9 |
| 27 | " | " | 53.5 | +3.8 |
| 28 | Ba-ferrite, α-FeOOH | " | 51.8 | +4.0 |

TABLE 2-continued

| Sample No. | Constituting Crystal Phase | Result of Electomicroscopic Observation | Magnetization Value (emu/g) | Temperature Coefficient of Coercive Force (Oe/°C.) |
|---|---|---|---|---|
| | γ-FeOOH | | | |

Tables 1 and 2 above prove the formation of the desired composite type magnetic powders by the reaction at the oxidation reaction temperature of 70° C. or higher, irrespective of the coercive force of the starting barium ferrite.

The results of the X-ray analysis prove the formation of mixed crystal particles containing non-magnetic particles, when the oxidation temperature was lower than 70° C., irrespective of the reaction time and the molar ratio of the alkali added, while the same prove the formation of two-crystal phase particles comprising barium ferrite and $Fe_3O_4$ (magnetite) or $\gamma$-$Fe_2O_3$ (maghemite) when the oxidation temperature was 70° C. or higher. From the results of the electromicroscopic observation and the electron ray-diffraction, it was proved that the barium ferrite and the spinel structure ferrite of magnetite or maghemite were in an epitaxial relation in the composite magnetic powders obtained.

The reaction time did not have any significant influence on the synthesis of the desired product, although the time seemed to be shortened with the elevation of the reaction temperature. Regarding the drying temperature, although the desired magnetic powders having a large magnetization value could be obtained even if the drying temperature is low, the drying temperature is preferably 130° C. or higher so that the epitaxially grown spinel structure ferrite may be formed into $\gamma$-$Fe_2O_3$.

Figure 2:
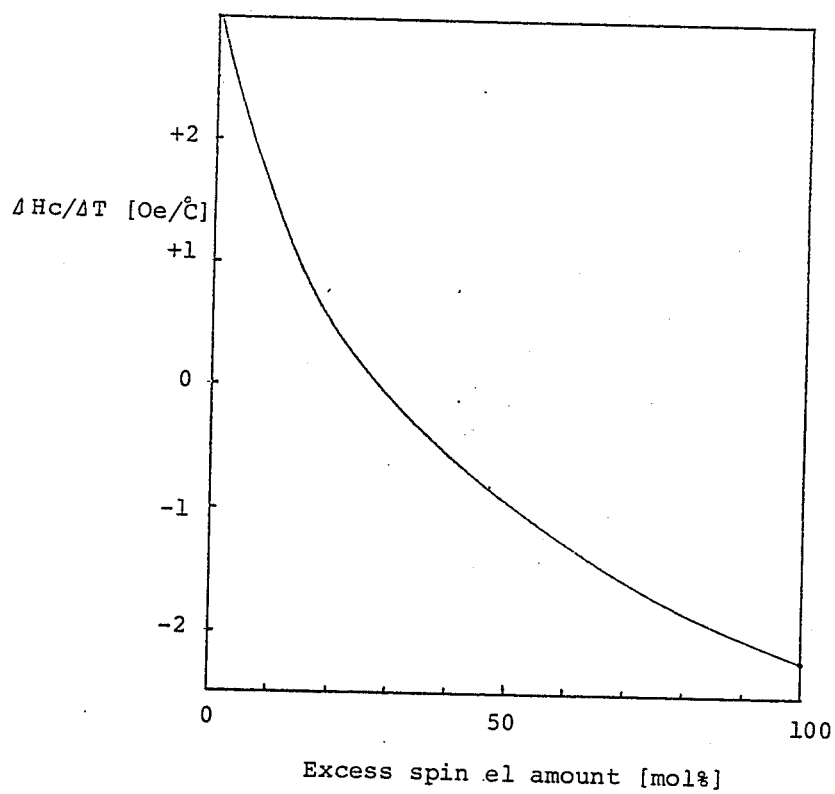
FIG. 2 is a graph to show a relation between the amount of the epitaxially grown spinel structure ferrite of the composite type magnetic powder of the present invention and the thermal coefficient of the coercive force of the powder.

It is noted from the above description that, in accordance with the present invention, the magnetic powders having excellent magnetic characteristic and thermal characteristic can be synthesized in a relatively simple aqueous solution and even at a relatively low temperature. In addition, when the amount of the spinel structure ferrite, which participates in the epitaxial growth, is properly controlled, as shown in FIG. 2, the thermal coefficient of the coercive force of the desired magnetic powder can be freely controlled.

Although the ferrous sulfate was used in this Example, ferrous chloride can also be used for the formation of the desired magnetic powder. Regarding the alkaline aqueous solution to be added during the synthesis, although NaOH was used in this Example, this may be replaced by KOH or the like without any problem.

EXAMPLE 2:

22.0 g of fine particles of hexagonal plate-like $SrFe_{12}O_{19}$ having a magnetoplumbite structure where a part of Fe was substituted by $Co^{2+}$—$Ti^{4+}$ ion pair (coercive force Hc=790 Oe, saturation magnetization Ms=52.9 emu/g, average particle size 1200 Å, average particle thickness 80 Å, specific surface area 49.0 $m^2/g$) were prepared and suspended in a 300 cc of distilled water from which the dissolved oxygen had previously been removed by bubbling with a nitrogen gas, in a reactor while a nitrogen gas was being introduced thereinto. Next, 17.0 g of ferrous sulfate ($FeSO_4.7H_2O$) was completely dissolved in a 300 cc of distilled water, and The resultant $Fe^{2+}$ ion-containing aqueous solution was added to the reactor.

Further, 150 cc of 2N sodium hydroxide was added thereto to obtain a colloidal suspension. The reactor containing the colloidal suspension was heated up to 70° C. with stirring the suspension with a nitrogen gas. Afterwards, the bubbling gas was changed from nitrogen to air, while the temperature was being kept at 70° C., and then, the reactor content was stirred for further 10 hours at 70° C. to complete the reaction. The resulting reaction solution was filtered, and the precipitate obtained by the filtration was fully washed with water and dried in a dry oven at 70° C. to obtain a desired powder.

Next, the reaction product thus obtained was subjected to X-ray analysis, electromicroscopic observation and VSM for identification and determination of the physical properties and the magnetic characteristics of the product. The experimental conditions are shown in Table 3, samples Nos. 1 to 28. The samples were prepared in the same manner, provided that the oxidation temperature, the pH concentration (molar ratio of the alkali added), the reaction temperature and others were varied as shown in Table 3, and the results of the X-ray analysis, electromicroscopic observation and VSM are shown in Table 4, Nos. 1 to 28.

The X-ray analysis was to confirm whether or not the desired two layer constitution of strontium ferrite/spinel structure ferrite was formed. The electromicroscopic observation was to confirm whether or not the two layer constitution, which had been confirmed by the said X-ray analysis, was crystallographically compounded and integrated, or in other words, whether or not the spinel structure ferrite had epitaxially grown on the surface of the strontium ferrite. In addition, from the result of the VSM, the saturation magnetization and the thermal coefficient of the coercive force of the respective products obtained were calculated.

TABLE 3

| Sample No. | Coercive Force of Starting Strontium Ferrite Powder (Oe) | Oxidation Temp. (°C.) | Molar Ratio of Alkali Added (—) | Reaction Time (hr.) | Drying Temp. (°C.) |
|---|---|---|---|---|---|
| 1 | 790 | 70 | 0.8 | 50 | 69 |
| 2 | 790 | 70 | 0.8 | 10 | 69 |
| 3 | 790 | 70 | 1.0 | 10 | 69 |
| 4 | 790 | 70 | 1.5 | 5 | 69 |
| 5 | 790 | 81 | 0.9 | 10 | 69 |
| 6 | 790 | 81 | 0.8 | 10 | 130 |
| 7 | 790 | 90 | 0.8 | 10 | 130 |
| 8 | 790 | 90 | 0.8 | 5 | 130 |
| 9 | 790 | 95 | 1.0 | 2 | 130 |
| 10 | 790 | 95 | 0.9 | 5 | 130 |

TABLE 3-continued

| Sample No. | Coercive Force of Starting Strontium Ferrite Powder (Oe) | Oxidation Temp. (°C.) | Molar Ratio of Alkali Added (—) | Reaction Time (hr.) | Drying Temp. (°C.) |
|---|---|---|---|---|---|
| 11 | 1020 | 72 | 0.7 | 10 | 70 |
| 12 | 1020 | 72 | 0.9 | 10 | 70 |
| 13 | 1020 | 77 | 1.0 | 20 | 70 |
| 14 | 1020 | 77 | 0.8 | 5 | 96 |
| 15 | 1020 | 77 | 0.85 | 10 | 96 |
| 16 | 1020 | 77 | 1.15 | 10 | 96 |
| 17 | 1020 | 91 | 0.7 | 5 | 128 |
| 18 | 1020 | 91 | 0.8 | 5 | 128 |
| 19 | 1020 | 91 | 1.0 | 5 | 128 |
| 20 | 1020 | 91 | 1.5 | 5 | 128 |
| 21 | 660 | 40 | 0.8 | 100 | 70 |
| 22 | 660 | 55 | 0.8 | 10 | 70 |
| 23 | 660 | 63 | 0.9 | 5 | 95 |
| 24 | 660 | 33 | 1.5 | 20 | 95 |
| 25 | 880 | 35 | 0.8 | 50 | 70 |
| 26 | 880 | 51 | 0.8 | 10 | 70 |
| 27 | 880 | 63 | 0.9 | 50 | 95 |
| 28 | 880 | 44 | 0.9 | 10 | 95 |

TABLE 4

| Sample No. | Constituting Crystal Phase | Result of Electromicroscopic Observation | Magnetization Value (emu/g) | Temperature Coefficient of Coercive Force (Oe/°C.) |
|---|---|---|---|---|
| 1 | Sr-ferrite, $Fe_3O_4$ | Completely Integrated Composite Form | 56.3 | +2.2 |
| 2 | " | Completely Integrated Composite Form | 55.9 | +0.6 |
| 3 | " | Completely Integrated Composite Form | 57.1 | +0.9 |
| 4 | " | Completely Integrated Composite Form | 56.0 | +1.2 |
| 5 | " | Completely Integrated Composite Form | 54.3 | +1.3 |
| 6 | Sr-ferrite, $Fe_2O_3$ | Completely Integrated Composite Form | 57.2 | +0.5 |
| 7 | " | Completely Integrated Composite Form | 56.1 | +0.8 |
| 8 | " | Completely Integrated Composite Form | 54.9 | +0.72 |
| 9 | " | Completely Integrated Composite Form | 56.6 | +0.5 |
| 10 | " | Completely Integrated Composite Form | 58.0 | ±0.0 |
| 11 | Sr-ferrite, $Fe_3O_4$ | Completely Integrated Composite Form | 57.5 | +1.0 |
| 12 | " | Completely Integrated Composite Form | 55.4 | +0.2 |
| 13 | " | Completely Integrated Composite Form | 53.3 | +0.4 |
| 14 | " | Completely Integrated Composite Form | 54.9 | +0.31 |
| 15 | " | Completely Integrated Composite Form | 57.3 | +0.9 |
| 16 | Sr-ferrite, $Fe_2O_3$ | Completely Integrated Composite Form | 56.7 | +1.0 |
| 17 | " | Completely Integrated Composite Form | 55.9 | +0.4 |
| 18 | " | Completely Integrated Composite Form | 54.8 | +0.8 |
| 19 | " | Completely Integrated Composite Form | 55.5 | +0.5 |
| 20 | " | Completely Integrated Composite Form | 57.0 | +1.1 |
| 21 | Sr-ferrite, α-FeOOH γ-FeOOH | Mixed Crystal | 50.0 | +4.4 |
| 22 | Sr-ferrite, α-FeOOH | " | 49.4 | +3.9 |
| 23 | " | " | 50.9 | +4.1 |
| 24 | " | " | 50.0 | +3.7 |
| 25 | Sr-ferrite, γ-FeOOH | " | 47.5 | +3.8 |
| 26 | Sr-ferrite, α-FeOOH | " | 50.9 | +4.1 |
| 27 | " | " | 50.2 | +4.5 |
| 28 | " | " | 51.9 | +4.3 |

Tables 3 and 4 above prove the formation of the desired composite type magnetic powders by the reaction at the oxidation reaction temperature of 70° C. or higher, irrespective of the coercive force of the starting strontium ferrite. The results of the X-ray analysis prove the formation of two-crystal phase particles comprising strontium ferrite and $Fe_3O_4$ (magnetite) of $\gamma$-$Fe_2O_3$ (maghemite) when the oxidation temperature was 70° C. or higher. From the results of the electromicroscopic observation and the electron ray-diffraction, it was proved that the strontium ferrite and the spinel structure ferrite were in an epitaxial relation in the composite magnetic powders obtained. The powder obtained by the reaction at the reaction temperature of lower than 70° C. comprised mixed crystal particles containing non-magnetic particles. The magnetization value of the magnetic powder obtained apparently increased in every case, and additionally, the thermal coefficient of the coercive force can gradually approach ±0. Accordingly, the effect attained by the present invention is remarkable. Although the drying temperature is unnecessary to be limited so as to obtain the desired magnetic powder, this is more preferably 130° C. or higher.

In this Example, ferrous sulfate was used as the salt for the $Fe^{2+}$ source. Needless to say, this salt may be replaced by ferrous chloride or the like to obtain the desired composite type magnetic powder in the same manner. Regarding the alkaline aqueous solution to be added during the synthesis, although sodium hydroxide was used in this Example, this may be replaced by potassium hydroxide without any problem to obtain the desired composite type magnetic powder in the same manner.

EXAMPLE 3:

22.0 g of fine particles of hexagonal plate-like $BaFe_{12}O_{19}$ having a magnetoplumbite structure where a part of Fe was substituted by $Co^{2+}$—$Mo^{4+}$ ion pair (coercive force Hc=1180 Oe, saturation magnetization Ms=56.1 emu/g, average particle size 1500 Å, average particle thickness 75 Å, specific surface area 51.4 $m^2/g$) were collected and suspended in a 300 cc of distilled water from which the dissolved oxygen had previously been removed by bubbling with a nitrogen gas, in a reactor while a nitrogen gas was being introduced thereinto. To this was added a solution containing $Fe^{2+}$ ion and $Co^{2+}$ ion as dissolved therein, which had been prepared by completely dissolving 17.0 g of ferrous sulfate ($FeSO_4.7H_2O$) and 8.5 g of cobalt sulfate ($CoSO_4.7H_2O$) in a 300 cc of distilled water.

Further, 150 cc of 2N sodium hydroxide was added thereto to obtain a colloidal suspension. The reactor containing the colloidal suspension was heated up to 70° C. with stirring the suspension with a nitrogen gas. Afterwards, the bubbled gas was changed from nitrogen to air, while the temperature was being kept at 70° C., and then the reactor content was stirred for further 10 hours at 70° C. to complete the reaction. The resulting reaction solution was filtered, and the precipitate obtained by the filtration was fully washed with water and dried in a dry oven at 70° C. to obtain a desired powder.

Next, the reaction product thus obtained was subjected to X-ray analysis, electromicroscopic observation and VSM for identification and determination of the physical properties and the magnetic characteristics of the product. The experimental conditions are shown in Table 5, samples Nos. 1 to 28. The samples were prepared in the same manner, provided that the oxidation temperature, the pH concentration (molar ratio of the alkali added), the reaction time and others were varied as shown in Table 5, and the results of the X-ray analysis, electromicroscopic observation and VSM are shown in Table 6, Nos. 1 to 28.

The X-ray analysis was used to confirm whether or not the desired two layer constitution of barium ferrite/spinel structure ferrite was formed. The electromicroscopic observation was used to confirm whether or not the two layer constitution, which had been confirmed by the said X-ray analysis, was crystallographically compounded and integrated, or in other words, whether or not the spinel structure ferrite had epitaxially grown on the surface of the barium ferrite. In addition, from the result of the VSM, the saturation magnetization and the thermal coefficient of the coercive force of the respective product obtained were calculated.

TABLE 5

| Sample No. | Coercive Force of Starting Barium Ferrite Powder (Oe) | Oxidation Temp. (°C.) | Molar Ratio of Alkali Added (−) | Reaction Time (hr.) | Drying Temp. (°C.) |
|---|---|---|---|---|---|
| 1 | 1180 | 73 | 0.8 | 2 | 64 |
| 2 | 1180 | 73 | 0.8 | 10 | 64 |
| 3 | 1180 | 73 | 1.5 | 10 | 76 |
| 4 | 1180 | 73 | 1.5 | 5 | 76 |
| 5 | 1180 | 88 | 0.8 | 5 | 76 |
| 6 | 1180 | 88 | 0.8 | 10 | 76 |
| 7 | 1180 | 88 | 1.0 | 10 | 76 |
| 8 | 1180 | 88 | 1.5 | 10 | 96 |
| 9 | 1180 | 94 | 0.8 | 2 | 96 |
| 10 | 1180 | 94 | 1.0 | 2 | 96 |
| 11 | 760 | 71 | 0.8 | 2 | 64 |
| 12 | 760 | 71 | 0.8 | 10 | 64 |
| 13 | 760 | 71 | 1.0 | 2 | 76 |
| 14 | 760 | 71 | 1.0 | 10 | 76 |
| 15 | 760 | 71 | 1.5 | 10 | 76 |
| 16 | 760 | 90 | 0.8 | 2 | 76 |
| 17 | 760 | 90 | 0.8 | 10 | 96 |
| 18 | 760 | 90 | 1.0 | 2 | 96 |
| 19 | 760 | 90 | 1.0 | 10 | 130 |
| 20 | 760 | 90 | 1.5 | 10 | 130 |
| 21 | 840 | 39 | 0.8 | 20 | 76 |
| 22 | 840 | 58 | 0.8 | 20 | 76 |
| 23 | 840 | 58 | 1.5 | 100 | 76 |
| 24 | 840 | 67 | 0.8 | 10 | 96 |
| 25 | 840 | 67 | 1.0 | 20 | 96 |
| 26 | 670 | 47 | 0.8 | 10 | 74 |
| 27 | 670 | 47 | 1.5 | 10 | 74 |

TABLE 5-continued

| Sample No. | Coercive Force of Starting Barium Ferrite Powder (Oe) | Oxidation Temp. (°C.) | Molar Ratio of Alkali Added (—) | Reaction Time (hr.) | Drying Temp. (°C.) |
| --- | --- | --- | --- | --- | --- |
| 28 | 670 | 58 | 0.8 | 100 | 96 |

TABLE 6

| Sample No. | Constituting Crystal Phase | Result of Electomicroscopic Observation | Magnetization Value (emu/g) | Temperature Coefficient of Coercive Force (Oe/°C.) |
| --- | --- | --- | --- | --- |
| 1 | Ba-ferrite, Co-ferrite | Completely Integrated Composite Form | 59.2 | +2.3 |
| 2 | " | Completely Integrated Composite Form | 59.8 | +1.1 |
| 3 | " | Completely Integrated Composite Form | 59.1 | +0.9 |
| 4 | " | Completely Integrated Composite Form | 58.8 | +0.4 |
| 5 | " | Completely Integrated Composite Form | 60.3 | +2.4 |
| 6 | " | Completely Integrated Composite Form | 59.4 | +0.8 |
| 7 | " | Completely Integrated Composite Form | 58.1 | +0.3 |
| 8 | " | Completely Integrated Composite Form | 60.1 | +2.1 |
| 9 | " | Completely Integrated Composite Form | 59.4 | +0.7 |
| 10 | " | Completely Integrated Composite Form | 58.8 | +0.8 |
| 11 | " | Completely Integrated Composite Form | 59.6 | +1.4 |
| 12 | " | Completely Integrated Composite Form | 61.0 | +2.5 |
| 13 | " | Completely Integrated Composite Form | 60.3 | +1.9 |
| 14 | " | Completely Integrated Composite Form | 58.4 | +0.4 |
| 15 | " | Completely Integrated Composite Form | 57.2 | +0.2 |
| 16 | " | Completely Integrated Composite Form | 58.7 | +0.8 |
| 17 | " | Completely Integrated Composite Form | 59.5 | +0.6 |
| 18 | " | Completely Integrated Composite Form | 60.0 | +1.9 |
| 19 | " | Completely Integrated Composite Form | 59.8 | +1.3 |
| 20 | " | Completely Integrated Composite Form | 58.6 | +1.1 |
| 21 | Ba-ferrite, $Co_3O_4$ $\alpha$-FeOOH | Mixed Crystal | 55.4 | +4.8 |
| 22 | Ba-ferrite, Co-ferrite $\alpha$-FeOOH | " | 59.6 | +2.4 |
| 23 | Ba-ferrite, Co-ferrite $Co_3O_4$ $\alpha$-FeOOH | " | 54.4 | +4.1 |
| 24 | Ba-ferrite, Co-ferrite $Co_3O_4$ | " | 55.8 | +3.9 |
| 25 | Ba-ferrite, Co-ferrite $Co_3O_4$ | " | 56.1 | +3.3 |
| 26 | Ba-ferrite, $Co_3O_4$ $\alpha$-FeOOH | " | 54.7 | +3.8 |
| 27 | Ba-ferrite, $Co_3O_4$ $\alpha$-FeOOH | " | 55.0 | +4.0 |
| 28 | Ba-ferrite, $Co_3O_4$ $\alpha$-FeOOH | " | 58.1 | +3.9 |

Tables 5 and 6 above prove the formation of the desired composite type magnetic powders by the reaction at the oxidation reaction temperature of 70° C. or higher, irrespective of the coercive force of the starting barium ferrite. Specifically, the results of the X-ray analysis prove the formation of mixed crystal particles comprising the starting barium ferrite and other non-magnetic particles such as Co-ferrite or $Co_3O_4$ (cobaltite), when the reaction temperature was lower than 70° C., while the same prove the formation of two-crystal phase particles comprising barium ferrite and cobalt ferrite when the reaction temperature was 70° C. or higher. From the results of the electromicroscopic observation of the two-crystal phase particles obtained by the reaction at the reaction temperature of 70° C. or higher, the two phases of the crystal particles were proved to be in a crystallographically epitaxial relation.

From the results of the measurement by VSM, it was proved that the magnetization value of the magnetic powder obtained remarkably increased higher than that of a powder obtained from the starting barium ferrite only, and additionally, it is noted that the thermal temperature of the coercive force of the respective magnetic powders obtained gradually approached ±0.

In this Example, although ferrous sulfate was used as the source of the ferrous ion-containing aqueous solution, this is not limitative, but this may be replaced by any other salt such as ferrous chloride or the like to attain the same results in the same manner. Regarding the alkaline aqueous solution to be added during the synthesis, although sodium hydroxide was used in this Example, this is not limitative but this may be replaced by potassium hydroxide or the like without any problem to obtain the desired composite type magnetic powder in the same manner.

EXAMPLE 4:

This Example is to illustrate one embodiment of the formation of a magnetic recording medium using the composite type magnetic powder obtained in the Example 1 above.

To 100 parts by weight of the composite type magnetic powder obtained in Example 1 (average particle size 1100 Å, average particle thickness 70 Å, saturation magnetization 58.1 emu/g, coercive force 640 Oe, specific surface area 43.7 m²/g) was added a mixture comprising 10 parts by weight of vinyl chloride-vinyl acetate copolymer, 10 parts by weight of polyurethane resin, 2 parts by weight of oleic acid, 5 parts by weight of carbon black, 5 parts by weight of α-alumina, 120 parts by weight of toluene, 120 parts by weight of methylethylketone and 80 parts by weight of cyclohexanone. The resulting mixture was milled and dispersed for 10 hours in a sand mill, to obtain a magnetic coating material. Further, 6 parts by weight of polyisocyanate were added to the magnetic coating material and blended and dispersed, followed by filtration with a 1 μm paper filter to collect the magnetic coating material. After the filtration, the coating material collected was coated on a PET (polyethylene terephthalate) film having a film thickness of 15 μm with an applicator and then dried. Afterwards, this was subjected to calender treatment so as to smoothen the surface coated, followed by slitting the film into a designed size, to obtain magnetic tapes for measurement.

The thermal variation of the coercive force of the thus-obtained magnetic tape was first measured with VSM. The results are shown in FIG. 3. In addition, the reproduction output power of the magnetic tape obtained in accordance with the present invention was measured. The results are shown in Table 7 below. In the measurement, the head-tape relative speed was 3.75 m/sec; and the recoridng-reproduction head used was a ring head having a gap length of 0.25 μm and a track width of 21.5 μm.

For comparison, comparative magnetic tapes were prepared in the same manner except that 100 parts by weight of each of commercial barium ferrite magnetic powder and Fe₃O₄ (magnetite) magnetic powder and a mixture powder of the two in an equivalent molar ratio were used. The reproduction output power of each of the magnetic tapes formed was measured. The results are shown in Table 7 below, samples Nos. 8*, 9* and 10*.

TABLE 7

| Sample No. | Constitution of Phase of Magnetic Powder Used | Temperature Coefficient of Coercive Force (Oe/°C.) | Reproduction Output at 7.5 MHz (dBm) | Reproduction Output at 10 MHz (dBm) |
|---|---|---|---|---|
| 1 | Ba-ferrite/Fe₃O₄ | ±0.0 | −36.2 | −37.8 |
| 2 | " | +0.5 | −37.9 | −38.7 |
| 3 | " | +0.8 | −38.1 | −39.5 |
| 4 | " | +1.1 | −37.4 | −38.3 |
| 5 | " | +0.9 | −36.9 | −38.1 |
| 6 | Ba-ferrite/Fe₂O₃ | +1.1 | −38.8 | −39.9 |
| 7 | " | +0.8 | −39.0 | −39.8 |
| 8* | Ba-ferrite | +4.5 | −45.0 | −58.0 |
| 9* | Fe₃O₄ | −2.3 | −42.9 | — |
| 10* | Ba-ferrite, Fe₃O₄ | +1.9 | −43.8 | −61.1 |

FIG. 3 proves the formation of the stable recording media in accordance with the present invention, the thermal coefficient of the coercive force being not influenced by the environmental temperature variation. Additionally, the results shown in Table 7 above prove the supriority of the magnetic powders of the present invention to the conventional barium ferrite single powder, spinel structure ferrite single powder and mixed powder comprising the two, which are shown as the comparative samples, in that the thermal coefficient of the coercive force of the magnetic powders of the present invention could remarkably be reduced as compared with the conventional samples and that the reproduction output power of the samples of the present invention could be kept large even up to the high frequency range as apparent from the results of the recording-reproduction experiment.

As described in detail in the above, the present invention can provide a magnetic recording medium which has a magnetic characteristic excellent in the weather-resistance and which is possible to maintain the high output power in a short wavelength range so as to applicable to digital recording, and the magnetic recording medium in accordance of the present invnetion is especially suitable for high-density recording.

Regarding the resin binder, although the two-component system comprising vinyl chloride-vinyl acetate copolymer and polyurethane resin was illustratively used in the above, other nitrocellulose series, vinyl chloride series or the like combinations can be used with no change of the characteristics of the media obtained. Although the combination of the solvents is preferably toluene, methylethylketone and cyclohexanone, the combination is not necessarily so-limited. As the non-magnetic support was used the polyethylene terephthalate film in this Example, but any other supports such as polyimide films or other polyester films can of course be used in the same manner without any trouble to obtain the same result.

From the above description, the advantageous merits of the present invention are apparent. Specifically, the magnetic powders in accordance with the present invention are excellent in the thermal characteristic of the coercive force and additionally have a characteristic of the large magnetization value. Further, the recording medium obtained by the use of the magnetic powder of the present invention is possible to give a high reproduction output power even in a short wavelength range (high frequence range) and is therefore suitable for use in digital recording. In addition, the magnetic recording medium in accordance with the present invention also is excellent in the thermal characteristic and the magnetic characteristic, and therefore this can be used for attaining high-density recording.

What is claimed is:

1. A magnetic recording medium formed by coating a composite type magnetic powder, each particle of which comprises a hexagonal ferrite and a spinel structure ferrite on a non-magnetic support together with a resin binder, wherein the hexagonal ferrite has a magnetoplumbite structure having the chemical formula $MO \cdot nFe_2O_3$ in which M is one or more metal elements selected from the group consisting of Ba, Sr, Pb and Ca and n is 5 to 6, the c(001)-plane of the hexagonal ferrite being crystallographically grown, and wherein the (111) plane of the spinel structure ferrite is crystallographically grown on the crystallographically grown C-plane of the hexagonal ferrite so that the hexagonal ferrite and the spinel structure ferrite are in a crystallographically epitaxial relation.

2. The recording medium as claimed in claim 1, wherein the spinel structure ferrite is selected from magnetite, maghemite, cobalt ferrite, lead-iron series ferrite, zinc-iron series ferrite and manganese-iron series ferrite.

* * * * *